June 18, 1940.  A. L. RICHE  2,204,949
CONTROL SYSTEM FOR A PLURALITY OF MOTORS
Filed Jan. 8, 1938  3 Sheets-Sheet 1

Fig. 1.

Inventor:
Arthur L. Riche
By
Oliver W. Storey
Atty.

June 18, 1940.  A. L. RICHE  2,204,949
CONTROL SYSTEM FOR A PLURALITY OF MOTORS
Filed Jan. 8, 1938   3 Sheets-Sheet 3

Patented June 18, 1940

2,204,949

UNITED STATES PATENT OFFICE 2,204,949

CONTROL SYSTEM FOR A PLURALITY OF MOTORS

Arthur L. Riche, Freeport, Ill., assignor to Micro Switch Corporation, Freeport, Ill., a corporation of Illinois Application January 8, 1938, Serial No. 183,950

14 Claims. (Cl. 172—239)

The present invention relates generally to motor control systems, and relates more particularly to the use of limit switches in controlling unidirectional motors operating through successive part cycles alternately to open and close valves and the like.

Unidirectional electric motors are used for operating the valves of heating systems in buildings and the like. In such systems, it has been the practice to start a motor by energizing it through the room thermostat, and then to maintain operation of the motor through a cam operated switch driven by the motor itself until the required valve operation was effected, so that the motor after being started completed a half cycle operation automatically. Considerable difficulty has been encountered with systems of this type when it has been attempted to control two or more motors from a single thermostat.

The separate motors generally do not operate at the same speed or finish their respective part cycles of operation simultaneously. This condition may be due to differences between the motors themselves or between the particular valves which they individually operate. Any known artifice for compelling the motors to complete their respective half cycles of operation simultaneously, such as, for example, the use of synchronous electric motors operated on alternating current, is expensive or impractical. One specific difficulty of operation has been that one motor having finished its half cycle ahead of another motor and having prepared its starting circuit for the next half cycle, would be restarted through a sneak circuit consisting of its own starting circuit and also the interconnected starting and maintaining circuits of a motor still running. Each motor would restart again and again with the result that all of the associated motors would run more or less continuously.

Certain artifices of timing have been employed in such systems in attempts to avoid restarting the motors through sneak circuits, such as, for example, the artifices of permitting the sneak circuits to exist for only short periods of time while lengthening the time during which a motor must run on its starting circuit. However, such attempts have been more or less unsatisfactory for they merely reduced and did not cure the difficulty. And in spite of all such attempts, the systems have been limited to the operation of comparatively few motors from each thermostat because each motor would produce its own separate sneak circuit during its own short interval and the separate intervals could occur consecutively and thereby augment the danger of restarting one or more of the fast motors.

An object of the present invention is the prevention of such sneak circuits by preventing the starting and maintaining circuits of such systems from being interconnected at any time at which one motor may have finished its operation while another has not.

A further object is the provision in a motor control system of the type mentioned of a double throw maintaining switch which substitutes the maintaining circuit for the starting circuit and vice versa.

A further object is the provision of a snap acting switch in a motor control system of the type mentioned for both stopping the motor and establishing a new starting connection at the end of each half cycle of operation.

A further object is the provision of an improved motor control system.

These and other objects and advantages will become apparent as the description proceeds.

The present invention is not limited to electric motors for it is applicable also to other types of motors such as, for example, hydraulic motors.

In order better to acquaint those skilled in the art with the teachings and practice of my present invention, I shall now describe certain specific embodiments thereof, by way of illustration and example, reference being had to the accompanying drawings which form a part of the specification and in which.

Figure 1:
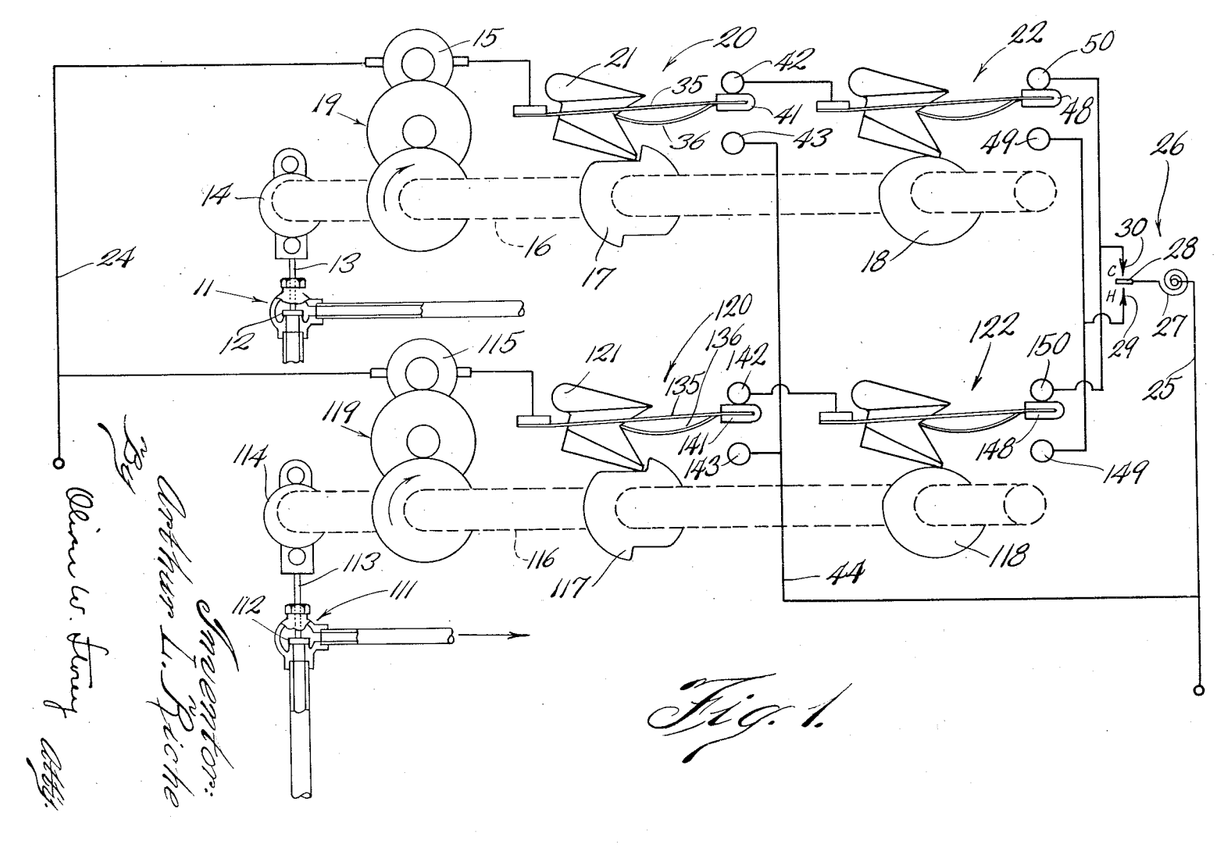
Fig. 1 is a schematic diagram of apparatus and electric circuit connections illustrating a system utilizing electric motors and embodying my present invention.

Fig. 1 illustrates an electrical control system for the automatic control of the heating of the room of a building wherein steam is admitted to radiators by means of valves 11 and 111 having orifice closing members 12 and 112 respectively.

The member 12 of the valve 11 is operated by a reciprocable stem 13 which is operated in turn by an eccentric cam 14 driven by a geared valve operator comprising an electric motor 15. The motor 15 rotates in only one direction.

A cycle of operation of the valve 11 consists, for example, in the opening and the subsequent closing of the valve. The opening and closing operations are accomplished by two successive 180° clockwise rotations of the cam 14 driven by the unidirectional motor 15 through the gear train 19. The valve is required to be either completely open or completely closed and consequently the valve operating cam 14 is required to execute complete individual one-half cycles of 180° each.

Carried on the same shaft 16 with the valve operating cam 14 are a pair of switch operating cams 17 and 18. The switch operating cam 17 operates a single pole double throw snap switch 20 which is employed as a motor maintaining switch. The cam 17 which operates this switch is symmetrical with respect to the axis of the shaft 16 so as to operate switch 20 in the same manner for each half cycle or 180° rotation of the valve operating cam 14, and so as to return the switch 20 to the same position at the end of each half cycle as it occupied at the beginning thereof. The cam 18 operates a similar single pole double throw snap switch 22 which is used as a starting channel selector switch. The cam 18 operating this switch is an eccentric cam. It has a single rise and moves the switch 22 in only one direction during each 180° rotation of the cam 14, so that the switch 22 occupies a different position at the beginning of each successive half cycle.

The valve 111 has a similar valve operator including motor 115 with a maintaining switch 120 and a selector switch 122. The two operators are similar in construction and the foregoing description of one will suffice for both.

A double pole thermostat 26 includes a bimetallic thermal element 27 which carries a moving electric contact 28. It also includes two separate stationary contacts 29 and 30 with which the moving contact 28 is adapted to make electric contact. Electric power for operating the two motors 15, 115 is supplied from two power terminals 24 and 25.

The electric motor 15 has one terminal connected to the power terminal 24 and the other connected to the moving contact 41 of its maintaining switch 20. The switch 20 is adapted to connect its motor 15 either through the stationary contact 42 to the starting channel selector switch 22 or to a maintaining circuit which extends along conductor 44 directly to the power terminal 25 avoiding the starting circuits through the thermostat 26. When the switch 20 connects the motor to the starting channel selector switch 22, this selector switch, in turn, connects the motor 15 to either the stationary contact 29 or the stationary contact 30 of the thermostat 26. The thermostat 26 is adapted to complete the connection through the starting circuit between the motor and the power supply. The motor 115 is similarly connected to its maintaining switch 120 and selector switch 122 as shown in Fig. 1.

The circuit connections from the contact 30 of the thermostat and the two contacts 50 and 150 of the two selector switches 22 and 122 constitute one starting control channel through which starting circuits for the two motors 15 and 115 may be prepared by the selector switches 22 and 122. Similarly, the circuit connections between the contact 29 of the thermostat 26 and the two contacts 49 and 149 of the two selector switches 22 and 122 constitute another starting control channel.

Figures 2, 3:
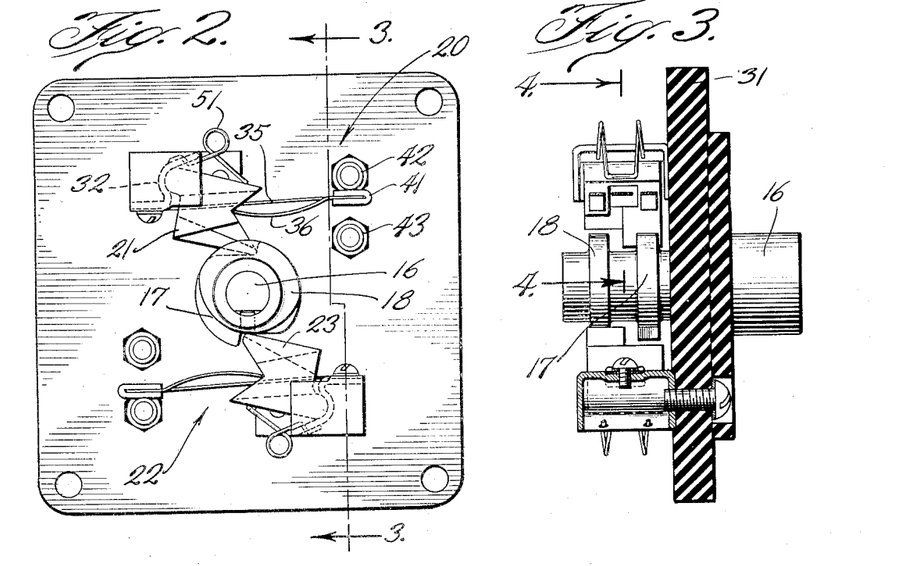
Figs. 2 and 3 are views of a limit switch assembly of one of the electric motor driven valve operators of the system of Fig 1, Fig. 3 being a section taken along the line 3—3 of Fig. 2.
Figure 4:
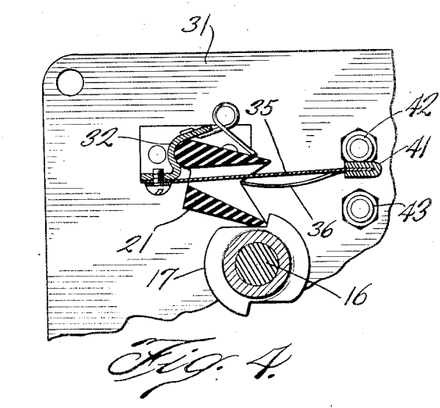
Figs. 4, 5, and 6 are detail views of parts of the switch assembly of Figs. 2 and 3.
Figure 5:
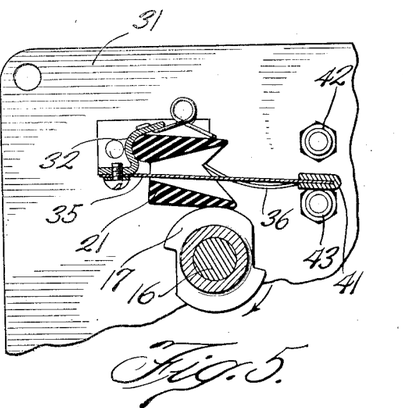
Figure 6:
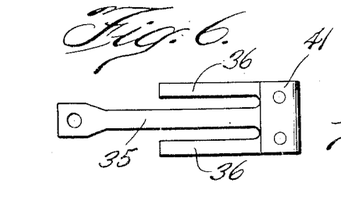

Referring to Figs. 2 and 3, the two switches 20 and 22 are mounted on a single piece of insulating material 31 so that the two cams 17 and 18 may be carried close together on the shaft 16, the two switches 20 and 22 being disposed on opposite sides of the shaft 16. This provides a compact assembly which is adapted to be fitted easily into the gear box of a motor driven valve operator. Referring more particularly to Figs. 4, 5, and 6, the snap switch 20 includes the follower 21 which is adapted to rock in a recess of a follower support 32 which follower support is supported on the insulating piece 31. The movable member of the snap switch comprises a tension member 35 which is secured to the follower support 32 and includes also a pair of compression members 36 which pivot in a pair of notches of the follower 21. These compression members 36 are bowed so that they may alter their lengths while continuing to hold the tension member 35 taut. The moving contact piece 41 which consists of silver contact material is carried by the compression and tension members 35 and 36 at the point where they join each other.

A spring 51 is mounted on the follower support 32 and bears against the follower 21 to hold the same firmly against the surface of the cam 17. As the cam 17 rotates the follower 21 rocks and in so doing moves the axis of support of the two compression members 36 across the line of tension of the tension member 35.

The stationary contacts 42 and 43 consist of tubes or cylinders of silver contact material supported on bolts. In the position in which switch 21 is shown in Fig. 2, the rotative effort or couple produced by the respective tension and compression forces of members 35 and 36 is in such a direction as to hold the moving contact 41 firmly against the upper stationary contact 42. As the cam 17 rotates in a clockwise direction as viewed in Fig. 2, it lifts the cam follower 21 and in so doing moves the axis of support of the compression member 36 into the center line of tension of the tension member 35. At this position the couple reduces to zero. As the cam 21 continues to rise, the axis of support of compression member 36 moves above the line of tension of tension member 35 and thereby reverses the couple. This reversal of the direction of the rotative effort moving contact 41 to be driven away from the stationary contact 42 and into engagement with the lower stationary contact 43. The construction and operation of the switch 22 is similar to that just described in connection with switch 20.

It will be observed that as the contact 41 begins its motion it carries the line of tension of the tension member 35 downward with it so as to increase the spacing between the lines along which the forces of tension and compression act. This causes the couple to increase as the contact 41 moves.

The construction of switches 120 and 122 is the same as that of switches 20 and 22. The operation of the system of Fig. 1 is illustrated by the following example: Assume that the apparatus is in the position shown in Fig. 1, both valves 11 and 111 being closed, both maintaining switches 20 and 120 connecting their respective motors to the selector switches 22 and 122 and both selector switches connecting the motors in turn to the stationary contact 30 of the thermostat 26. As the temperature of the room falls the contact 28 of the thermostat comes into engagement with the contact 30 and the starting circuit to each motor is established through its selector and maintaining switches. The motors immediately begin their operation rotating the various cams 14, 17 and 18, and 114, etc. in the clockwise direction as indicated by the arrows.

Shortly after this rotation has begun, the cam 17 driven by motor 15 causes its maintaining switch 20 to operate and the moving contact 41 thereof snaps from stationary contact 42 to contact 43 to open the starting circuit and then to establish the maintaining circuit through the conductor 44. Thereafter, motor 15 continues its operation regardless of any change in the starting circuit, because the motor no longer is connected to the starting circuit. During the continued operation of the motor 15 subsequent to the operation of its maintaining switch 20, the selector switch 22 operates snapping its moving contact 48 from the stationary contact 50 to the contact 49 to change the starting control over to the stationary contact 29 of the thermostat 26. The switches 120 and 122 of the motor 115 operate similarly.

It is unlikely that the two motors would run at the same speed or complete their respective half-cycles of operation simultaneously, and in the present system it is unnecessary that they should do so, because each motor is separately controlled by its own maintaining switch. Assume that motor 15 is faster than motor 115 and reaches the end of its half-cycle of operation first. Accordingly when cam 14 has rotated 180° and moved valve 11 to its open position, the follower 21 of the maintaining switch 20 of the faster valve operator drops off the step of its cam 17 and again operates the snap switch 20. The operation of the snap switch 20 consists in the moving contact 41 snapping from the contact 43 to the contact 42 first to open the maintaining circuit and then to reconnect the motor 15 to the selector switch 22. Because the maintaining switch 20 moves its contact 41 from contact 43 to contact 42 with a single and continuous snap action, the switch cannot fail to reconnect the motor to its starting circuit after having disconnected the motor from its maintaining circuit. The selector switch 22 having been operated previously to the operation of the maintaining switch 20, now extends the motor starting circuit to the contact 29 of the thermostat 26. This leaves the motor 15 deenergized.

Subsequently the slower motor 115 completes its half cycle of operation and its maintaining switch 120 similarly first disconnects the motor 15 from its maintaining circuit by moving its contact 141 away from its stationary contact 143 and then reconnecting the motor to the selector switch 122 by bringing contact 141 into engagement with stationary contact 142. This leaves motor 115 also connected to contact 29 of thermostat 26.

In this system two precautions are provided against improperly restarting the faster motor (the first to stop) during the time that the slower motor is completing its operation. The first precaution is accomplished by preventing interconnections between the two starting control channels and the second by preventing interconnection between a starting circuit and a maintaining circuit of a motor.

If motor 15 were sufficiently faster than motor 115, it could complete its half cycle of operation and stop before selector switch 122 of motor 115 operated. In such a case motor 15 would be idle but connected to contact 29 of the thermostat 26, while motor 115 would be running with selector switch 122 about to operate. The contact 30 of the thermostat would be in engagement with contact 28 so that an interconnection between the two starting channels (as between contacts 149 and 150 of selector switch 122) would energize and restart motor 15. But switch 122 being of the double throw type avoids making any such interconnection because moving contact 48 thereof leaves stationary contact 50 before engaging the other stationary contact 49.

Similarly, because the maintaining switch 120 of the slower motor 115 (the last one to stop) is of the double pole type and first disconnects the motor 115 from its maintaining circuit and thereafter reconnects the motor to its starting selector switch 122, no interconnection is permitted between the starting and maintaining circuits. Consequently, the faster motor 15 (the first to stop) cannot be energized for an improper restart. Just before the slower motor 115 reaches the end of its half cycle, the moving contacts 48 and 148 of the two selector switches 22 and 122 are in engagement with their stationary contacts 49 and 149. As a result, the stationary contacts 42 and 142 of both of the two maintaining switches 20 and 120 are connected to thermostat contact 29 and therefore to each other, and the idle motor 15 being also connected thereto could be energized by providing a connection between contacts 142 and 143 of the maintaining switch 120 of the running motor 115. Such a connection is prevented by the double pole action of the maintaining switch 20 which breaks the maintaining circuit of the motor 115 before reconnecting the motor to its starting circuit. Thus as the slower motor 115 reaches the end of its half cycle its cam 117 operates its switch 122, the moving contact 141 of which leaves its stationary contact 143 to interrupt the maintaining circuit and stop the motor and then moves into engagement with stationary contact 142 to reconnect the motor 115 to its selector switch 122 in preparation for the start of the next half cycle of operation.

The avoidance of interconnections between different starting channels and between starting and maintaining circuits while a motor is idle prevents improper restarting of the motors. Interconnections occurring while there are no idle motors can do no harm since the sole danger is the restarting of an idle motor. Obviously the preventing of a motor from stopping at its proper time would amount to restarting it on another half cycle of operation.

Figure 7:
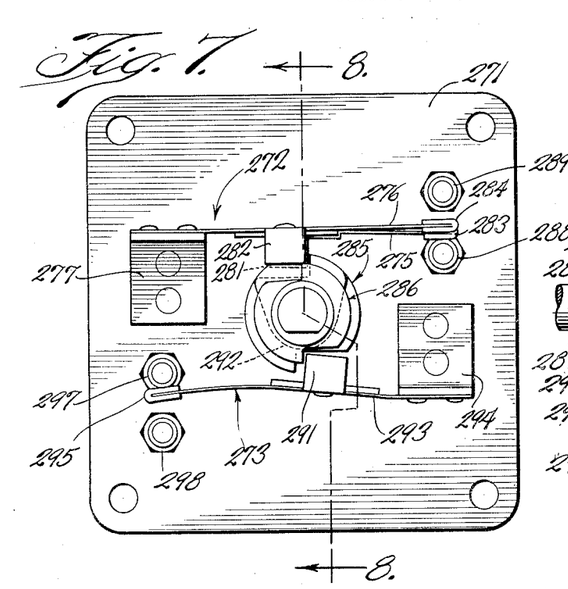
Fig. 7 is a view of a modified limit switch for an electric motor of a valve operator.
Figure 8:
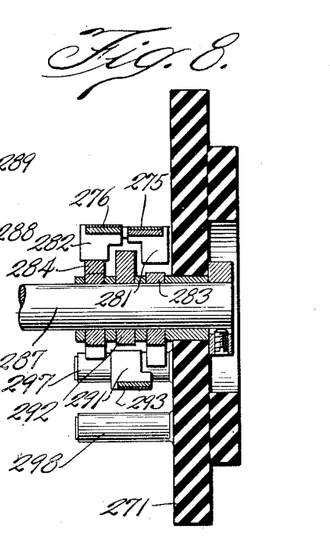
Fig. 8 is a view partly in section of the switch of Fig. 7 taken along the line 8—8 of Fig. 7.
Figure 9:
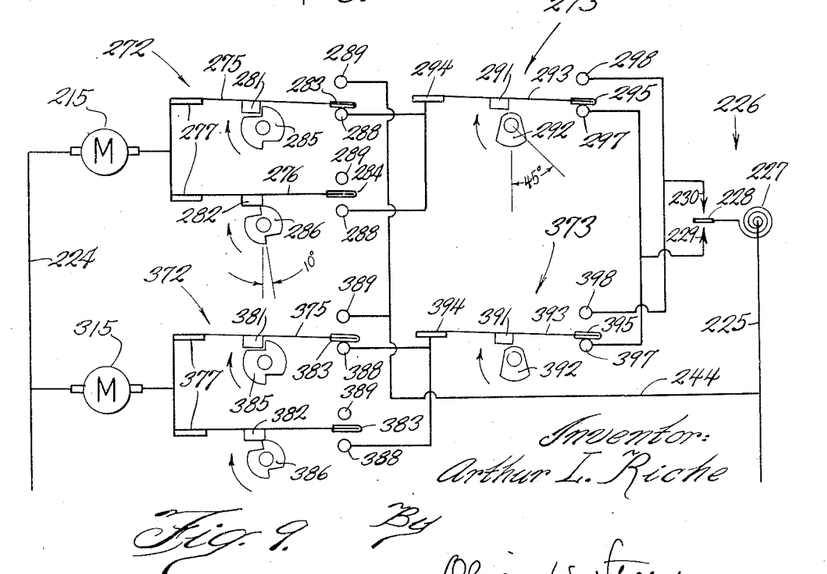
Fig. 9 is a diagram illustrating an electric control system utilizing the switch of Fig. 7 and embodying the present invention.

Figs. 7, 8, and 9 illustrate another embodiment of my present invention. In Figs. 7 and 8 a limit switch assembly for an electric motor operation of a valve includes a mounting plate 271 of insulating material which carries a motor maintaining switch 272 and a starting channel selector switch 273. The motor maintaining switch includes two flexible cantilever springs 275 and 276 supported on a conducting bracket or terminal 277. The cantilever springs 275 and 276 carry cam followers 281 and 282 respectively and also moving contacts 283 and 284 respectively. The springs 275 and 276 and their contacts 283 and 284 are operated by cams 285 and 286 respectively, which engage cam followers 281 and 282, both of which are mounted in, and driven by a shaft 287. Each of the cams 285 and 286 has two steps or drop-offs spaced 180 degrees apart, and the two cams are mounted on the shaft 287 so that the steps of the cam 285 are 10 degrees in advance of the steps of the cam 286. (Clockwise rotation as viewed in Fig. 7 is assumed.) In addition the lift of the cam 286 is less than that of the cam 285 so that the cam 286 flexes the cantilever spring 276 through a smaller distance than the cam 285 flexes the cantilever spring 275.

The motor maintaining switch 272 includes also a pair of stationary contacts 288 and 289 which are adapted to cooperate with the two moving contacts 283 and 284. Both of the contacts 283 and 284 are adapted to come into engagement with the stationary contact 288 when their respective followers drop off the steps of their cams 285 and 286. However, only the contact 283 is lifted high enough by its cam to come into engagement with the stationary contact 289, the short lift of the cam 286 being insufficient to lift the contact 284 into engagement with the stationary contact 289.

The starting channel selector switch 273 includes a cantilever spring 293 supported on a bracket or terminal 294. This spring 273 carries a moving contact 295 which is adapted to engage separately two stationary contacts 297 and 298. The spring 293 carries also a cam follower 291 which cooperates with a cam 292 carried on the shaft 287. The cam 291 has only a single rise and is designed to operate the cantilever spring 293 and its moving contact 295 so that the moving contact 295 lies in contacting engagement with one of the stationary contacts 297 or 298 at the time that the cam followers 281 and 282 of the cantilever springs 275 and 276 drop off the steps of their cams 285 and 286.

The cam 292 is provided with a 90 degree high and a 90 degree low separated by two connecting slopes each extending 90 degrees about the cam. The cam 292 is adjusted on the shaft 287 so that its follower 291 rides on the approximate center of either the high or the low at the time that follower 281 drops off a step of cam 285.

The respective shapes of the individual cams 285, 286, and 293 and their relative orientations on shaft 287 are also shown in the diagram of Fig. 9.

The circuit of a system utilizing the limit switch assembly of Figs. 7 and 8 is shown in Fig. 9 and is substantially the same as the circuit of Fig. 1. The system of Fig. 9 illustrates diagrammatically the motors and their maintaining and selector switches of a system which includes two valve operators. A complete limit switch assembly of the type shown in Figs. 7 and 8 is shown for each motor. Each limit switch assembly consists of a motor maintaining switch (two contact springs and cams) and a starting selector switch. In the diagram of Fig. 9 the two springs 275 and 276 of the motor maintaining switch 272 are shown separated. Accordingly, the stationary contacts 288 and 289 are duplicated in the diagram in order to indicate clearly the relation between those stationary contacts and the moving contacts 283 and 284.

In the system of Fig. 9, power is supplied for the operation of motors 215 and 315 from a power supply through the conductors 224 and 225. Each motor 215 and 315 has one terminal connected to the power conductor 224 and its other terminal connected to its motor maintaining switch. Thus motor 215 is connected to the terminal 277 (shown in duplicate) of the cantilever springs 275 and 276 of the motor maintaining switch 272. The stationary contacts 288 and 289 are connected respectively to the bracket 294 of the selector switch 273 and to a conductor 244 which is connected directly to the other power conductor 225. Similarly, motor 315 is connected to maintaining switch 372 and to selector switch 373. The two stationary contacts 297 and 298 of the selector switch 273 and corresponding contacts 397 and 398 of selector switch 373 are connected to two stationary contacts 230 and 229 of a thermostat 226 to provide control channels for the starting of the motors 215 and 315. The thermostat 226 is essentially the same as the thermostat 26 of Fig. 1, and includes a thermally responsive element 227, a moving contact 228 carried by the thermal element, and stationary contacts 229 and 230 adapted to be engaged separately by the moving contact 228. Similarly to the two motors 15 and 115 of the system of Fig. 1, the two motors 215 and 315 of the system of Fig. 9 utilize the same control channels to the thermostat 226, whereby the single thermostat 126 is adapted to control the starting of both of the motors.

The operation of the system of Fig. 9 is illustrated by the following example. In the condition of the system indicated in Fig. 9, both of the motors 215 and 315 are idle, both of their maintaining circuits are open, both of their selector switches are connecting the motors to the same control channel, namely to the contact 229 of the thermostat 226, and the starting circuits of both motors are open at the thermostat 226 because the contact 228 does not lie in engagement with either of the two stationary contacts 229 and 230. Assume now that the contact 128 of the thermostat 226 moves into engagement with the contact 229. Thereupon both motors 215 and 315 will be energized. The circuit for energizing motor 215, for example, will extend from the motor through the spring 275, moving contact 283 and stationary contact 288 of its maintaining switch 272 and thence through its selector switch 273 to the stationary contact 229 of the thermostat 226.

As motor 215, for example, begins its operation, it will drive all the cams 285, 286, and 292 in a clockwise direction as viewed in Fig. 9. After 10 degrees of rotation the cam follower 282 will drop off the step of its cam 286 and permit moving contact 284 carried by spring blade 276 to drop into engagement with stationary contact 288. This will establish a circuit path shunting the path through the cantilever spring blade 275 and moving contact 283. As the motor 215 continues to operate, cam 285 lifts its follower 281 and moves moving contact 283 out of engagement with stationary contact 288 and then into engagement with stationary contact 289, the circuit for the motor being maintained meanwhile through spring blade 276, moving contact 284, stationary contact 288 and the selector switch 273. When the moving contact 283 comes into engagement with the stationary contact 289, the starting and maintaining circuits of the motor become interconnected.

Moving contact 283 carried by blade 275, having come into engagement with stationary contact 289, the maintaining circuit is established through the conductor 244 to operate the motor 215 thereafter without requiring the starting circuit through the selector switch 273 to be maintained. Shortly after the maintaining circuit is established cam 286 lifts spring 276 to disengage moving contact 284 from stationary contact 288. This operation terminates all interconnection between the starting and maintaining circuits of motor 215 and disconnects the motor 215 completely from its selector switch 273. Although the starting and maintaining circuits of the motor 215, for example, are interconnected from the time that the maintaining circuit is established at contacts 283 and 289 until the contacts 284 and 288 separate to disconnect the selector switch 273 from the motor 215, this brief interconnection occurs early in the half cycle of operation of the motors when motor 315 will not have had sufficient time to have completed its half cycle. Similarly the interconnection between the starting and maintaining circuits of motor 315 occur before motor 215 has had time to complete its half cycle. Consequently, there will be no idle motor ready to be restarted at the time that these interconnections occur.

As motor 215 continues to operate, its cam 292 lifts the spring 293 of its selector switch 220 to disengage the contact 297 and engage the contact 298 in order to prepare a new starting circuit through the starting control channel leading to stationary contact 230 of the thermostat 226 in preparation for next half cycle of operation.

Similarly motor 315 is connected to its maintaining circuit and then disconnected from its starting circuit by its maintaining switch 372 and thereafter selector switch 373 prepares a new starting circuit through the control channel leading to the thermostat contact 230 in preparation for the next half cycle of operation. As the two motors operate independently one motor generally will finish ahead of the other. Assume that motor 215 is the faster one.

As the faster motor 215 approaches the end of its half cycle of operation, its selector switch 273 has its moving contact 295 engaging its stationary contact 298, maintaining switch 272 has its moving contact in engagement with the stationary contact 289 for maintaining the operation of the motor, contact 284 is held by cam 286 out of engagement with both of the stationary contacts 288 and 289, and follower 281 is just ready to drop off the step of the cam 285 to interrupt the maintaining circuit. At this time the slower of the two motors 315 may be in any part of its corresponding half-cycle of operation providing it has opened its starting circuit by lifting its contact 384 from its contact 388 of its maintaining switch 372.

The faster motor 215 completes its half cycle by operating its cam 285 into the position in which the follower 281 drops off the step of that cam and causes moving contact 283 to disengage stationary contact 289 to open the maintaining circuit and then drop into engagement with the stationary contact 288 to prepare the starting circuit through the selector switch 273 for the next half cycle of operation. Inasmuch as the contact 283 moves with a snap motion when the follower 281 drops off the step of the cam 285, it moves positively from the contact 289 into engagement with the contact 288 regardless of whether or not the cam 285 continues to rotate slightly as the motor 215 coasts to a stop. The motor 215 may stop leaving the cam 286 in the position shown in Fig. 9 in which it holds contact 284 out of engagement with both of the stationary contacts 288 and 289. However, if the motor 215 should coast so far that contact 284 should come into engagement with contact 288 no harm can result because the contacts would merely shunt the path through contacts 283 and 288.

The slower motor 315 then may continue its operation uninterrupted and unaffected by the termination of the operation of the faster motor 215. As motor 315 reaches the end of its half cycle of operation its cam follower 281 drops off the step of its cam 285 and opens its maintaining circuit and establishes its starting circuit through its selector switch 373 for the next half cycle in the same manner as did the faster motor 215.

Like the system of Fig. 1, the system of Fig. 9 prevents interconnections between the separate starting channels by employing double throw selector switches. Also, like the system of Fig. 1, the system of Fig. 9 avoids interconnection between starting and maintaining circuits during the time that any motor is idle by employing a double throw maintaining switch which operates with a snap action in stopping the motor and reconnecting it to its starting circuits.

My present invention positively prevents an idle motor which may have completed its half cycle of operation ahead of the other motors from being energized from the motors that are still running, and at the same time compels positive and certain operation of the selector and maintaining switches to insure that no motor shall be left idle with its switches in such positions that the thermostat could not restart the motor.

My present invention is not limited to systems using electric motors, but may be employed in systems employing other types of unidirectional motors. For example, pneumatic or hydraulic motors may be employed, and in that case conduits and valves are to be substituted for the electric conductors and switches of the electric system.

Neither is the invention limited to the control of motors in symmetrical half cycles. Thus, for example, it may be employed to control motors to operate in a complete cycle, in two unequal part cycles, or in any number of equal or unequal part cycles.

Furthermore the control system is not limited to the control of two motors but may be expanded to any number of motors. In fact one of the advantages of my system over prior systems is that it does not become less reliable in operation as the number of motors is increased.

While I have shown and described certain specific embodiments of my present invention by way of example and illustration, it will be apparent to those skilled in the art that those specific embodiments are capable of many modifications and variations without a departure from the spirit and teachings of my invention. Therefore, I do not wish to be limited except by the scope of the appended claims.

I claim:

1. In a system comprising a plurality of apparatuses each requiring operation in individual part cycles and each including an electric motor, a power supply, conductors constituting a plurality of starting control channels, each of which is common to all said apparatuses, and a starting switch for completing starting circuits through separate starting control channels; the combination with each motor, of: a starting channel selector switch for said motor operated thereby for preparing starting circuits for said motor through said separate control channels; means for connecting said motor separately (1) to said selector switch for energizing the motor through a starting circuit and (2) to said power supply for maintaining energization of said motor independently of said starting circuits; said means including a double throw switch operated by said motor.

2. In a system comprising a plurality of apparatuses each requiring operation in individual part cycles and each including a motor, a power supply, conductors constituting a plurality of starting control channels, each of which is common to all said apparatuses, and a starting switch for completing starting paths through separate starting control channels; the combination with each motor, of, a starting channel selector switch for said motor for preparing starting paths for said motor through said separate control channels, a double-throw maintaining switch for said motor for connecting said motor (1) to said selector switch for energizing the motor through a starting path and (2) to said power supply for maintaining energization of said motor through a maintaining path independent of said starting paths, and means operated by said motor for operating said maintaining and selector switches, said means including apparatus for operating said maintaining switch with a single snap action and for accomplishing both of the following operations in that single snap action: interrupt said maintaining path and connect said motor to said selector switch, whereby any elapse of time between said two operations must be inappreciable compared to the time required for said part cycle of operation.

3. In a system comprising a plurality of apparatuses each requiring operation in individual part cycles and each including a motor, a power supply, conductors constituting a plurality of starting control channels, each of which is common to all said apparatuses, and a starting switch for completing starting paths through separate starting control channels; the combination with each motor, of, a starting channel selector switch for said motor for preparing starting paths for said motor through said separate control channels, a double-throw maintaining switch for said motor for connecting said motor separately (1) to said selector switch for energizing the motor through a starting path and (2) to said power supply for maintaining energization of said motor through a maintaining path independent of said starting paths, and means operated by said motor for operating said maintaining and selector switches, said means including apparatus for operating said maintaining switch with a single snap action first to interrupt said maintaining path and then to connect said motor to said selector switch, whereby said maintaining switch avoids energizing any motor starting circuits from the maintaining circuit just prior to the interruption of said maintaining circuit, and whereby also said maintaining switch avoids leaving both the maintaining and the starting circuits open at said maintaining switch when the apparatus is at rest.

4. In a system including two apparatuses each requiring operation in undivided predetermined part cycles, but which require different periods of time for completing their respective part cycles of operation, each of said apparatuses including an electric motor, conductors constituting a plurality of starting control channels each of which is common to both said motors, and a starting switch for completing starting circuits through separate starting control channels to initiate simultaneously part cycles of operation of both said apparatuses, whereby the slower one of said apparatuses has an unfinished portion of its part cycle left to be completed after the other of said apparatuses has completed its corresponding part cycle, the combination with the slower motor, of, a starting channel selector switch for said motor, a maintaining switch for said slower motor including a double throw contact blade for connecting said slower motor separately to its selector switch and a maintaining circuit, a stepped cam driven by said slower motor for operating said double throw blade to change the connection of said slower motor from said maintaining circuit to the selector switch of said slower motor with a continuous snap action, said maintaining switch also including means for connecting said motor simultaneously to both said maintaining circuit and selector switch while changing the connection of the motor from the selector switch to the maintaining circuit.

5. The combination of claim 4 wherein, said last means consists of a single throw contact blade and a cam for operating it.

6. In a system comprising a plurality of apparatuses each including a motor and one double throw control switch for all said motors, the combination with each motor, of, a switch actuated by said motor for interrupting one motor energizing circuit to stop said motor and for closing another motor energizing circuit, said one motor energizing circuit including said motor and said control switch, said switch actuated by said motor consisting of a double throw snap switch constructed to move with a continuous snap motion from one circuit closing position to the other, whereby said switch avoids leaving both said two motor energizing circuits closed when the apparatus is at rest and also avoids leaving both said two circuits interrupted at said switch when the apparatus is at rest.

7. In a system comprising a plurality of apparatuses each including a motor and shaft, and comprising also a double throw control switch for all said motors, the combination with each motor and shaft, of, a switch actuated by said shaft and operable thereby to change the circuit through which the motor is energized, at least one of the two circuits selected by said switch actuated by said motor including said control switch, said switch actuated by said shaft consisting of a double throw snap switch constructed to operate with a continuous snap motion from one circuit closing position to the other, whereby said switch avoids leaving both energizing circuits for said motor closed when the apparatus is at rest and also avoids leaving both said two circuits interrupted at said switch when the apparatus is at rest.

8. In a system comprising a plurality of power operators, a separate motor for driving each operator, and a starting control means for connecting said motors to a source of power, said starting control means providing a plurality of independent starting control channels for said motors, said starting control means being common to all said motors for supplying power thereto for starting said motors, the combination with said motors, of, a plurality of independent channel selectors for selecting the channels through which said motors may be energized for starting, each motor being controlled by only one of said starting channel selectors, each starting channel selector being so constructed that it is operable to switch each motor under its control from one to another of said starting control channels, but in so doing to avoid interconnecting any of said plurality of starting control channels, each of said starting channel selectors being further so constructed that it avoids leaving the energizing circuit for said motor interrupted at said selector when the apparatus is at rest, each said starting channel selector consisting of a double throw snap switch actuated by a motor controlled thereby for operating with a snap action to disconnect said motor from one starting channel and for connecting it to another starting channel.

9. In a system including two apparatuses each requiring operation in undivided predetermined part cycles, but which may require different periods of time for completing their respective part cycles of operation, each of said apparatuses including an electric motor, conductors constituting a plurality of starting control channels each of which is common to both said motors, a starting channel selector switch for the motor of each apparatus, and a starting switch for completing starting circuits through separate starting control channels to initiate simultaneously part cycles of operation of both said apparatuses, whereby the slower one of said apparatuses may have an unfinished portion of its part-cycle left to be completed after the other of said apparatuses has completed its corresponding part cycle; the combination with the slower motor, of, a double throw maintaining switch for said motor for connecting said motor at times to said selector switch to permit energizing the motor through a starting circuit, and at times to a maintaining circuit for energizing said motor independently of the starting circuits, and means for operating said maintaining switch and said selector switch of said slower motor during the predetermined part cycle of operation thereof as follows: (1) to provide during said part cycle a substantially continuous energization of said slower motor first through its selector switch and a first starting circuit and finally through a maintaining circuit, and (2) to operate said selector switch during the time that said slower motor is energized through its maintaining circuit to prepare a new starting circuit for said motor, said double throw maintaining switch and the means for operating it being so constructed and arranged that, at the end of said part cycle of operation of said slower motor, said maintaining switch operates with a double throw snap motion both to interrupt the maintaining circuit to stop the motor and also to connect said motor to the starting circuit newly prepared by said selector switch whereby to avoid any appreciable energization of the idle faster motor from the maintaining circuit of the slower motor through any interconnected starting circuits of those motors.

10. In a system including two apparatuses each requiring operation in undivided predetermined part cycles, but which may require different periods of time for completing their respective part cycles of operation, each of said apparatuses including an electric motor, conductors constituting a plurality of starting control channels each of which is common to both said motors, a starting channel selector switch for the motor of each apparatus, and a starting switch for completing starting circuits through separate starting control channels to initiate simultaneously part cycles of operation of both said apparatuses, whereby the slower one of said apparatuses may have an unfinished portion of its part-cycle left to be completed after the other of said apparatuses has completed its corresponding part cycle; the combination with the slower motor, of, a double throw maintaining switch for said motor for connecting said motor at times to said selector switch to permit energizing the motor through a starting circuit, and at times to a maintaining circuit for energizing said motor independently of the starting circuits, and means for operating said maintaining switch and said selector switch of said slower motor during the predetermined part cycle of operation thereof as follows: (1) to provide during said part cycle a substantially continuous energization of said slower motor first through its selector switch and a first starting circuit and finally through a maintaining circuit, and (2) to operate said selector switch during the time that said slower motor is energized through its maintaining circuit to prepare a new starting circuit for said motor, said maintaining switch and the operating means therefor being so constructed and arranged that, at the end of said part cycle of operation of said slower motor said operating means operates said maintaining switch with a double throw motion to interrupt the maintaining circuit to stop the motor, and thereafter to connect said motor to the starting circuit newly prepared by said selector switch whereby to avoid interconnecting said maintaining circuit and newly selected starting circuit so as to avoid connecting the idle faster motor through the interconnected starting circuits to the maintaining circuit of the slower motor.

11. In a system comprising a plurality of apparatuses each requiring operation in individual part cycles and each including a motor, a source of power for operating said motors, conductors constituting a plurality of starting control channels for supplying power to said motors, each of said channels being common to all said apparatuses, a starting switch for completing starting circuits through separate starting control channels, and a starting channel selector switch for each motor for preparing starting circuits therefor through said separate control channels, the combination with each motor, of, a switch operated by said motor for controlling connections of said motor to said source of power, said switch being so constructed and arranged that it is operated by said motor (1) to connect said motor only to its selector switch during one portion of said predetermined part cycle and (2) to establish a maintaining circuit for connecting said motor to power independent of said starting circuits and to disconnect said motor from its selector switch during another portion of said part cycle of operation, whereby interconnected starting circuits cannot be energized through said selector switch by said maintaining circuit during said other portion of said part cycle.

12. In a system comprising a plurality of apparatuses each requiring operation in individual part cycles and each including a motor, a power supply, conductors constituting a plurality of starting control channels, each of which is common to all said apparatuses, and a starting switch for completing starting paths to separate starting control channels, the combination with each motor, of, switch means (1) for connecting said motor to one of said starting control channels to provide a starting circuit for the motor, and (2) for energizing said motor to operate it through said predetermined part cycle, said switch means including a switch operable at the end of said predetermined part cycle first to disconnect said motor from power to stop it, and next to establish circuit connections in a starting circuit for said motor through another of said starting control channels so that the starting circuit so prepared is incomplete only at the starting switch, said switch operable at the end of said predetermined part cycle consisting of a double throw switch operated by the motor which it controls for first disconnecting the motor from power and then connecting it to said other starting control channel.

13. In a system comprising a plurality of apparatuses each requiring operation in individual part cycles and each including a motor, a source of power for operating said motors, conductors constituting a plurality of starting control channels for supplying power to said motors, each of said channels being common to all said apparatuses, and a starting switch for completing starting circuits through separate starting control channels, the combination with each motor, of, a starting channel selector switch for said motor for preparing starting paths for said motor through said separate control channels, means (1) for connecting said motor to said selector switch for energizing the motor through a starting path, (2) for connecting said motor to said power supply for maintaining energization of said motor through a maintaining path independent of said starting paths, (3) for energizing said motor only through said maintaining path as said apparatus approaches the end of its predetermined part cycle of operation, and (4) for interrupting said maintaining path and preparing a new starting control path through another starting control channel without interconnecting said maintaining path and said control channels, said means including a double throw, snap acting, maintaining switch operated by said motor, and so connected in the system that it is operable (1) to connect and disconnect said motor and selector switch and (2) to open and close said maintaining path, said maintaining switch being so constructed that at the end of said predetermined part cycle it operates with a single snap action, first to interrupt said maintaining path and then to connect said motor to said selector switch.

14. In a system comprising a plurality of apparatuses each requiring operation in individual part cycles and each including an electric motor for driving it, conductors constituting a plurality of starting control channels each of which is common to all of said apparatuses, and a starting switch for completing starting circuits through said separate starting control channels, the combination with each motor, of, a starting channel selector switch for said motor for preparing starting circuits for said motor through said separate starting control channels, a cam driven with said motor for operating the selector switch to transfer the starting circuit for said motor from one to another of said starting control channels, means (1) for connecting the motor to the selector switch and for so maintaining it during a short period at the beginning of each of said part cycles, (2) for connecting the motor directly to the power supply and for so maintaining it during substantially the remainder of each part cycle, and (3) for disconnecting the motor from said selector switch sufficiently early in said part cycle to insure that said motor will be disconnected from said selector switch before any other motor completes a corresponding part cycle of operation, said means including a double throw switch for connecting the motor separately (1) to said selector switch for energizing the motor through a starting circuit, and (2) to said power supply for maintaining energization of said motor independently of said starting circuits, said means including also a cam driven with said motor for operating said double throw switch.

ARTHUR L. RICHE.